(12) United States Patent
Moravec

(10) Patent No.: US 11,436,279 B2
(45) Date of Patent: Sep. 6, 2022

(54) DYNAMICALLY BUILDING FILE GRAPH

(71) Applicant: Code42 Software, Inc., Minneapolis, MN (US)

(72) Inventor: Andrew Moravec, Hugo, MN (US)

(73) Assignee: Code42 Software, Inc., Minneapolis, MN (US)

(*) Notice: Subject to any disclaimer, the term of this patent is extended or adjusted under 35 U.S.C. 154(b) by 594 days.

(21) Appl. No.: 16/186,376

(22) Filed: Nov. 9, 2018

(65) Prior Publication Data

US 2020/0151280 A1  May 14, 2020

(51) Int. Cl.
*G06F 16/901* (2019.01)
*G06F 16/13* (2019.01)
*G06F 16/14* (2019.01)
*G06F 16/178* (2019.01)

(52) U.S. Cl.
CPC ......... *G06F 16/9024* (2019.01); *G06F 16/13* (2019.01); *G06F 16/148* (2019.01); *G06F 16/178* (2019.01)

(58) Field of Classification Search
CPC .................................................. G06F 16/9024
See application file for complete search history.

(56) References Cited

U.S. PATENT DOCUMENTS

| 2012/0209886 | A1* | 8/2012 | Henderson | G06F 16/9024 |
|---|---|---|---|---|
| | | | | 707/E17.011 |
| 2016/0179887 | A1* | 6/2016 | Lisonbee | G06F 16/9024 |
| | | | | 707/718 |
| 2016/0210294 | A1* | 7/2016 | Komarov | G06F 16/2228 |
| 2020/0067713 | A1* | 2/2020 | Struttmann | G06F 21/78 |

* cited by examiner

*Primary Examiner* — Van H Oberly
(74) *Attorney, Agent, or Firm* — Schwegman Lundberg & Woessner, P.A.

(57) ABSTRACT

System and techniques for dynamically building a file graph are described herein. Meta data is received for a first and a second file. An intersection of the first metadata set and the second metadata set is computed. An edge in a file graph is created based on the intersection. Then, after receiving a query about the first file, the second file is provided as a result to the query based on the edge in the file graph.

24 Claims, 5 Drawing Sheets

DYNAMICALLY BUILDING FILE GRAPH

TECHNICAL FIELD

Embodiments described herein generally relate to computer file systems and more specifically to dynamically building a file graph.

BACKGROUND

File systems are data structures commonly used in computing devices. File systems are often hierarchically organized, with entities representing the organization (e.g., directories or folders) and data stored in the file system (e.g., documents, images, libraries, executables, etc.) referred to herein as files. Other entities, often with file semantics, may also be stored in a file system, such as device handles, named pipes, etc.

Typically, file system entities have associated meta data, such as access permissions (e.g., create, read, write, destroy, etc.) that may pertain to a file or to entities within a directory. Other meta data, such as size, dates (e.g., creation date, modification date, etc.) may also be maintained. The file system entities and associated meta data may be stored with the files and directories themselves, as is the case in a file system that uses i-nodes, in one or more tables, as is the case in a file system that uses a file allocation table (FAT), or a combination of these approaches.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
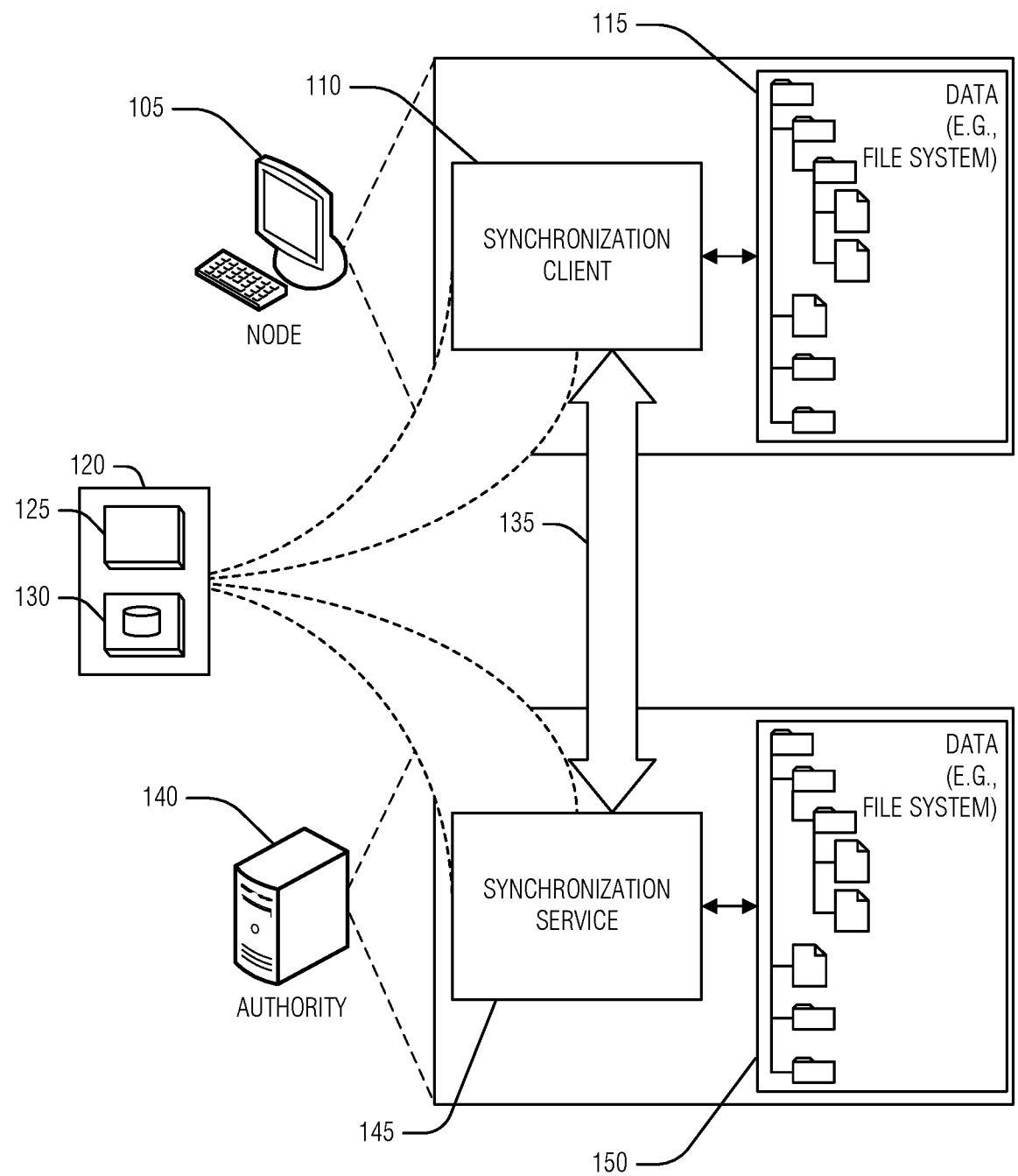
FIG. 1 is a block diagram of an example of an environment including a system for dynamically building a file graph, according to an embodiment.

Documents, diagrams, images, or other artifacts (e.g., files) are created throughout every modern organization. These artifacts can capture the intellectual, or other, property from which many organizations now draw their value. The content of these artifacts has a life-cycle; it is created, it can evolve (e.g., be modified), it can be shared or copied, and can be destroyed. During its lifecycle, the content can pass through the hands of several individuals or processes (e.g., machine consumers of data). Often, the content is developed or maintained in systems that are outside the regulating influence of content management or version control systems. This content creation and handling environment can lead to several problems for organizations. The problems can include security issues, in which sensitive data is inadvertently, uncarefully, or maliciously shared with unauthorized parties. These same activities can endanger trade secrets, or other business intelligence. Further, lack of content control can lead to misplaced or erased data that can represent costly work by an organization.

Some have attempted to reconstruct content lifecycles via file system, or file metadata. Here, a file metadata inventory is captured over time as file content is modified and distributed. However, each change or distribution is not generally recorded or indexed. Thus, navigating these changes often requires an implied assertion made by the human user as to what any given event indicates about the content (e.g., a file of the same size appearing upon two different user accounts at the same time can be inferred to be sharing of the content to these two different users). A variation involves computing hash values on all or part of the file. This provides some insight into copies of parts of files within other files. That is, searching for file hash values on file modification events where the source hash is equal to a previously known hash, enables the end hash to be used for a subsequent search. Here, each transition involves another user interaction and round trip. For example, a forensic search can be deployed to collect file events that include files being created, modified, and deleted. In these events, the file size, name, or digest hash can be calculated. This information is collected and indexed to enable security administrators, for example, to search across a large number of these events in their organization. This search organization enables a user to quickly search millions of events, retrieve the results, and make conclusions based on these search results.

However, due to the incomplete picture of the content lifecycle provided by current technique, the result set requires significant expertise by a user and still fails to capture some situations. Specifically, while the results can provide significant insight, is generally only along one dimension. For instance, a search to find file events for a file named "plans.docx" or a PDF named "urgent_pressrelease.pdf" are generally searching only the file metadata and not file content. If a content-oriented search is performed, files with a given digest hash can be searched but simple modifications, such as digitally signing a document or making a single character change, will not match.

To address the issues noted above, file transformations can be inferred from metadata metrics as they are captured. For example, a back-up or synchronization (e.g., synch) service can scan a filesystem periodically or be informed of file system changes as they happen. A graph data structure can be built that represents content lifecycles. The edges of the graph can represent transitions between file states represented by nodes of the graph. Such as data structure enables a user to uniquely identify content, identify meaningful iterations of change, and identify where it appears, possibly how it is replicated across an organization. The graph data structure enables these changes to be visualized to help organizations identify who is creating what kind of content and how is it traversing the organization. This insight can reveal blind spots and identify meaningful communication patterns to help the organizations apply meaningful policies and protections while also encouraging content development and dissemination.

To compute the graph edges (e.g., to infer state transitions) transitional relationships between disparate elements in the metadata inventory can be subject to a heuristic algorithm during ingestion of the metadata. The heuristics produce file state relationships that can be asserted or indexed, resulting in an immediately searchable and traceable logical graph of content transitions or distribution over time.

Using the graph-based techniques described herein, organizations can map and track content creation and dissemination across users, devices (e.g., laptops, smartphones and tablets), content types (e.g., diagrams, specifications, plans, etc.). Thus, those in an organization can answer questions, such as: who had this press release before the announcement; who had access to the secret project charter; the new specs for our widget showed up on the dark web, who could have leaked it; individual X submitted the report, who contributed to it; I know a spreadsheet had personally identifying information (PII), who else had this file or its predecessor or derivatives? Additional details and examples are described below.

FIG. 1 is a block diagram of an example of an environment including a system 120 for dynamically building a file graph, according to an embodiment. As illustrated, the system 120 can be included in a synchronization client 110 of a device 105 (e.g., node, personal computer, tablet, mobile phone, laptop, etc.) or a synchronization service 145 of a server 140 (e.g., appliance). As illustrated, the synchronization client 110 observes local filesystem 115 changes and provides updates to the synchronization service 145 via an interlink 135. These updates are then used to modify the reference filesystem 150. Other clients may update the reference filesystem via the synchronization service. These updates may be propagated to the client 105 via the interlink 135 to modify the local filesystem 115.

The system 120 includes processing circuitry 125 and a data store 130. The data store 130 can be arranged to maintain metadata of the local file system 115 used in the synchronization of the local filesystem 115. Further, the data store 130 can include instructions that configure the processing circuitry to implement a graph of file state changes for the local filesystem 115.

The processing circuitry 125 can be a stand-alone processor (e.g., of the client 105 or the server 140), or it can encompass circuitry that is already part of these devices. However, the processing circuitry 125 executes the instructions of the data store to implement several techniques. For example, a first metadata set can be received for a first file and a second metadata set can be received for a second file. Here, receipt of the metadata sets can include retrieval from the data store 130, retrieval from the local filesystem 115 (e.g., via periodic scanning), or via a message or interrupt from the local filesystem 115. In an example, each of these metadata sets can include a file name, a file size, a path, a finger print (e.g., a hash of the file, a hash of portions of the file, etc.), permissions (e.g., read, write, execute, etc.), access control structure (e.g., access control list, user, users, or groups to which the permissions apply, etc.), storage information (e.g., what volume, block, etc. the data is stored upon), among other things.

In an example, the first metadata set is received in response to a first file synchronization operation and the second metadata set is received in response to a second file synchronization operation. Thus, the metadata acquisition is part of a synchronization (e.g., a backup is created at a remote device such as the server 145) operation. However, the system 120 can be employed within the local filesystem 115 itself, or in an operating system of the client 105 to produce the same graph. Such local accounting can be useful for auditing or other purposes.

The processing circuitry 125 can compute an intersection of the first metadata set and the second metadata set. Here, intersection refers to the common set-theory operation whereby elements common in two sets are within the intersection of the two sets. Thus, in an example, the first metadata set is compared to the second metadata set to determine which elements of metadata are common between the two sets. In an example, a tolerance is used to determine sameness. Thus, if two values are within the tolerance from each other, they are considered the same for this operation. For example, if a timestamp of the local filesystem 115 is measured to the millisecond, but the tolerance for time is set at one second, then modification timestamps for two files that are within one second of each other are considered to be equal even though they may differ by several milliseconds. In an example, the tolerance is specific to a type of member (e.g., to the type of metadata). Thus, time-based metadata can be compared under a first tolerance and text-based data under a second tolerance, such as prefix or suffix matching out to a certain number of characters, statistical similarity in texts, etc.

Once the common metadata elements are determined from the intersection, an edge in the file graph is created by the processing circuitry to represent a state change in a filesystem element (e.g., file or directory). Thus, in an example, a node in the file graph identifies a file. In an example, the node includes at least one of a user identification, a device identification, or a storage location. In an example, the filesystem element is identified by at least one of a path, a size, a name, or a hash of the file contents.

A variety of heuristic techniques can be applied to the metadata intersection to determine the nature of the state transition. Generally, metadata that is common to the two sets of metadata, but different in value (e.g., different beyond the tolerance for that type of metadata) can be used to determine what has happened to the file. For example, if the two sets of metadata are the same except for path and creation date, then it can be inferred that the second file is a copy of the first file.

The following are several examples of intersection content and a determination of the graph edge type from that content. In an example, the edge is a file creation type. Here, the first metadata set is empty, the content having not been previously created. In an example, the edge is a file rename type. Here, the intersection does not include a file name (because the file name is different between the first and second metadata sets). In an example, the edge is a file revision type. Here, the intersection does not include a content hash—e.g., because the content of the file has changed between the two files although much of the other metadata, such as the file name and path, remains the same. In an example, the edge is a file move. Here, the intersection does not include a path (e.g., because the path is different even though much of the other metadata remains the same). In an example, the edge is a file share (e.g., the file is made available to a new user). Here, the intersection does not include an access control list, or at least does not include an entity (e.g., user) on the access control list.

Once the file graph is created, it can be used to perform multidimensional searches of content transformation. Thus, the processing circuitry 125 is configured to receive a query about the first file and provide the second file, based on the edge, as a result to the query. That is, the query provides the first file, or an indication thereof. The file graph can be followed from a node representing the first file. The following takes the form of edge traversals. Each subsequent node connected via edges and intervening nodes to the first file can be returned to the user, representing state transitions for the first file and the content therein.

Figure 2:
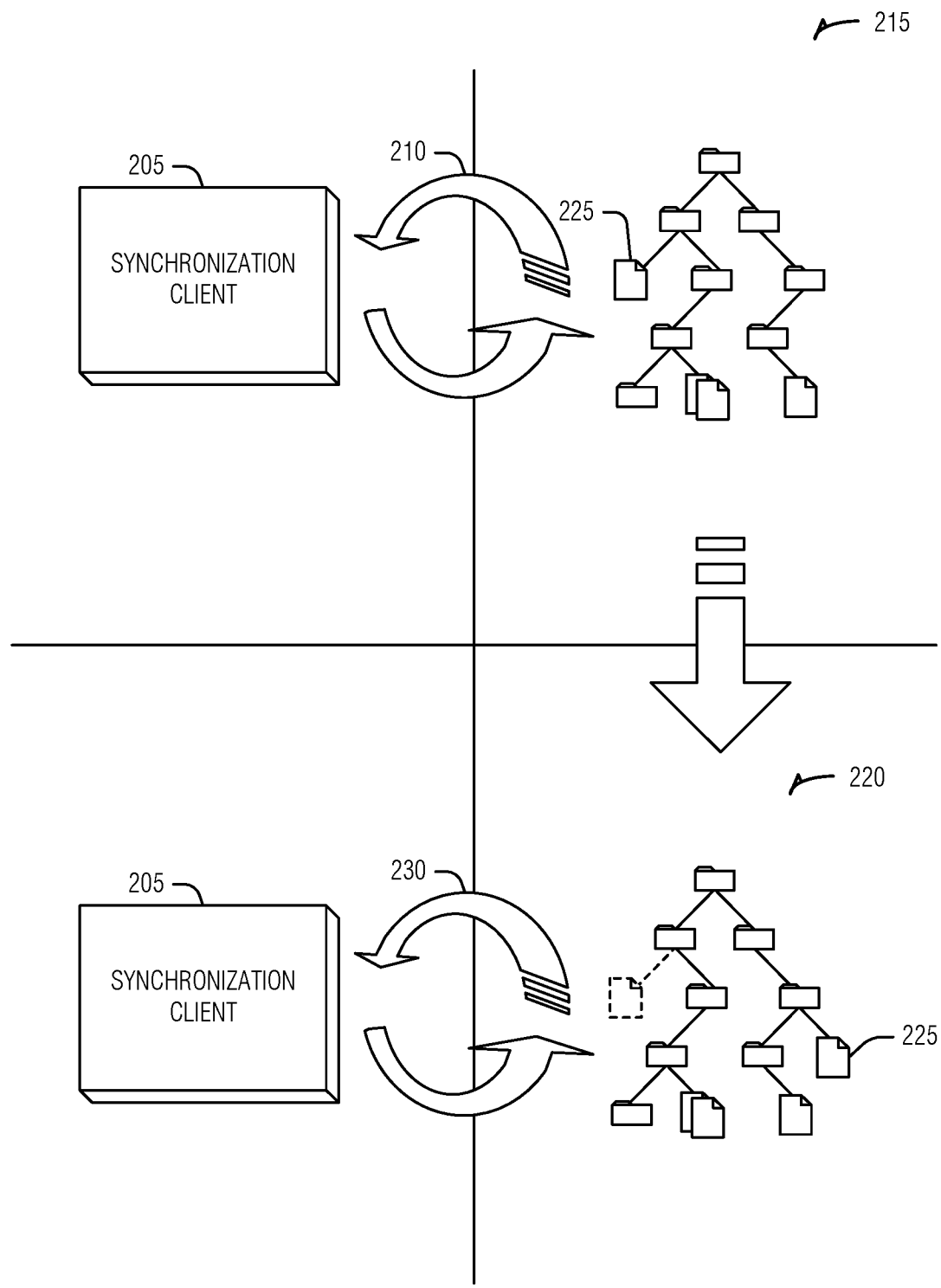
FIG. 2 illustrates an example of a filesystem modification during remote synchronization, according to an embodiment.

FIG. 2 illustrates an example of a filesystem modification 215 during remote synchronization, according to an embodiment. As illustrated, the synchronization client 205 performs, at a first time 215, an inspection 210 a local filesystem that includes file 225. The inspection 210 captures metadata about the file 225. At a second time 220, the synchronization client 205 performs another inspection 230 of the file system. Here, the file 225 has moved. However, the synchronization client 205 will likely note be informed of the move by the filesystem, or operating system. Rather, to the synchronization client 205, it will appear that the file 225 from time 215 has been deleted, and that the file 225 in time 220 is a newly created file.

Viewing the intersection of metadata from the first inspection 210 and the second inspection 230, however, reveals that the file 225 from time 215 differs only in path and creation date to that of time 220. Thus, an inference rule (e.g., heuristic) can be used in which such a similarity of metadata represents a file move. Below are a number of other conditions that can be used to infer what state change occurred based on the file metadata.

For example, file creation involves a first appearance of a file. The file may be created a user at a specific time. Files are created and modified repeatedly on endpoints. The earliest time a unique file exists that has no earlier file revision adjacencies can be labeled as the point of initial content creation.

File revision can involve a file with the same path on the same device where a hash of its contents (e.g., a content hash) changes at a specific time. In the event of a file modify event, a file revision action or adjacency can be applied between the new event and the most recent event that matches the file path, file name, and extension on the same device.

A file renaming can involve a file with the same content hash that has a different name at a specific time. On a file create event, if a file delete event occurs within an acceptably small time period to a file that has a non-zero size and the same file hash, a file rename adjacency can be applied between the delete and create events.

A file share can involve a file that appears to be a file creation except that it has metadata that matches a present file already in existence. For example, when indexing a file create event on a centralized index, instances of files with the same hash of the file can be searched for on other devices. If the same file contents are found on another device, this file can be labeled as a shared or copied file. Here, the file being created is not the original source of the file content. If that similar file content is found in only one other device within an acceptably small amount of time, a direct file share adjacency can be asserted.

A file-type conversion involves a file being transformed from one type (e.g., a text file) to another (e.g., an image). On a file create event, if the file path and name are the same as another file that exists on the system, but the extension, magic number, or similar type identifier is different, an adjacency can be asserted that the files are related but the type has changed. This can further be refined in common cases where the MIME types are known to be related. For instance, if a DOC file is saved to PDF, or an image file is saved as a different known image file format, the rules can be applied to assert that this is related content expressed in different file formats.

a file copy involves the same file being replicated in a device. For example, when indexing a file create event, if another file with the same hash exists on the same device, an assertion can be made that the two events are related. Here, the file was copied from the file found at the earlier time to the file created at a later time.

A file deletion involves the removal of the file. In an example, when indexing file delete operations, the previous adjacencies in the file history can be evaluated to determine if all other related instances have also been deleted. If they have, then this event can be asserted to be the final deletion in the scope of management or the terminal event in the content lifecycle.

Figure 3:
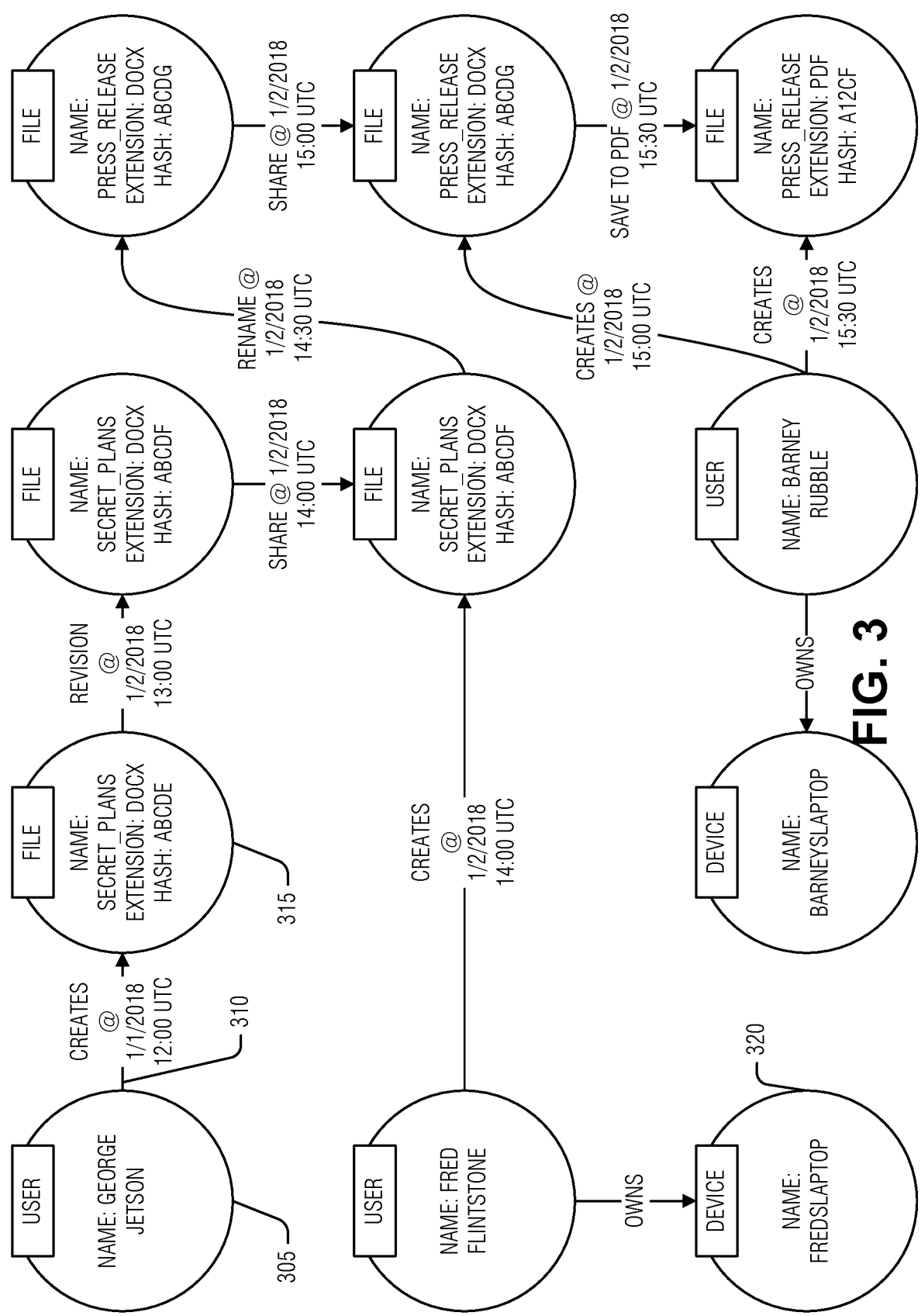
FIG. 3 illustrates an example of a graph database of file events, according to an embodiment.

FIG. 3 illustrates an example of a graph database of file events, according to an embodiment. Several nodes, such as a first node 305 and a second node 315 are illustrated. Each of the nodes is connected by an edge, such as edge 310. Origin nodes, such as the user node 305, or device node 320, are the only nodes in this file graph that do not have an edge leading to them. Otherwise, the remaining nodes, such as file node 315, are preceded by an edge indicating a file state transition leading to the file represented by the file node.

The illustrated file graph represents file system relationships over time. Given this organization, the search system can provide query results to answer complex questions by a user. Such as, if Fred's laptop was compromised on January 3rd, did that device contain the contents of the press release that has not yet been released? Following the path from the press-release backwards, it is clear that the file was created on January second, 2018. Thus, the answer is yes. This result was not generally possible under previous techniques that merely compared metadata after-the fact.

Another example can include, a suspicion that George Jetson is insider threat. Does he have any content related to our pending press release? Following the edges backwards from the press-release file nodes, the content can be traced back to George Jetson who actually created the content and made the most revisions. This last fact can be used to infer that he is likely primary author.

Future Work

Additional queries answerable by the file graph and generally outside the scope of other techniques can include:
  What files were downloaded from a browser? This can be determined by the application that created the file.
  What files were uploaded via a browser after a user had sensitive information?
  Was a sensitive file ever read by a certain application, such as a message board or social media application of a client device?

In an example, in addition to collecting file events from endpoint agents (e.g., the client node), integration from cloud-to-cloud with content collaboration platforms can enable traceability (e.g., of intellectual property) as it flows to and from these locations and interacts with endpoints or users that may not have an endpoint agent (e.g., synchronization client) on them.

In an example, file and connected process activity can be monitored to uniquely identify events that are potential transformations of content or format. For example, a running endpoint can identify a process that reads a file and shortly thereafter writes a file with a different extension and format. Augmented with some content, it may be easier to identify applications such as tar and zip that may be used to obfuscate content and use to exfiltrate and evade existing controls and email filters. However, the file graph can be used to determine that such obfuscation was happening, resulting in, for example, knowledge that intellectual property was leaving the company even if it is in a new format.

In an example, the metadata can be augmented with file analysis beyond, for example, mere hashes of parts of the content. For example, the content can be scanned (e.g., using trained neural networks, regular expressions, etc.) to identify meaningful patterns in content such as account numbers, addresses, or PII. These meaningful patterns can be added to the metadata to distinguish between different file state events. In combination with the obfuscation identification techniques, the graph traversing queries enable tracing of sensitive information lifecycles through an organization. This can be used, for example, for audit policy compliance, security enforcement, etc.

Figure 4:
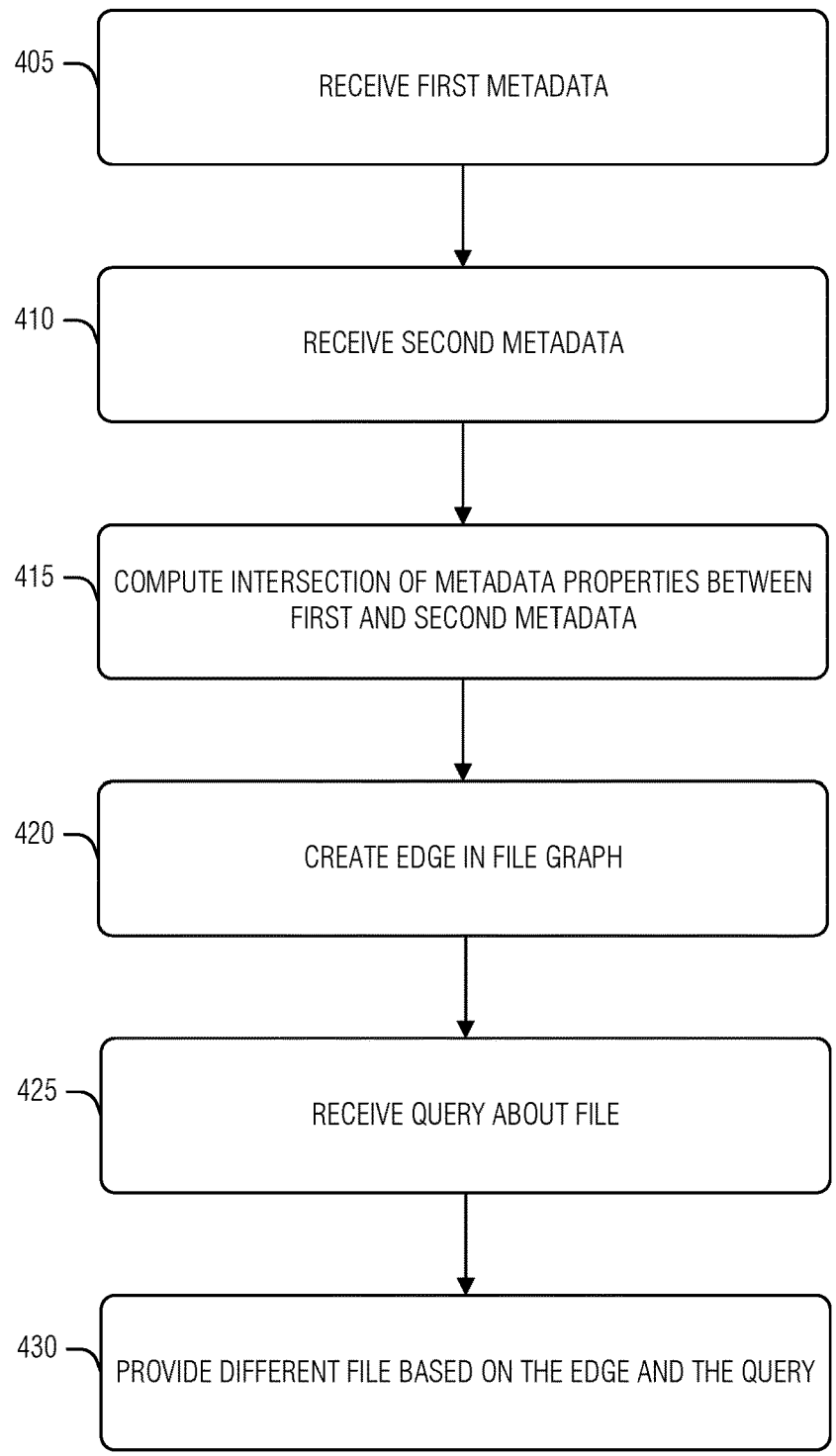
FIG. 4 illustrates a flow diagram of an example of a method for dynamically building a file graph, according to an embodiment.

FIG. 4 illustrates a flow diagram of an example of a method 400 for dynamically building a file graph, according to an embodiment. The operations of the method 400 are performed by electronic hardware, such as that described above or below (e.g., circuitry).

At operation 405, a first metadata set for a first file is received.

At operation 410, a second metadata set for a second file is received. In an example, the first metadata set is received in response to a first file synchronization operation. Here, the second metadata set is received in response to a second file synchronization operation. In an example, the first and the second file synchronization operations create a backup of a file system at a remote device.

At operation 415, an intersection of the first metadata set and the second metadata set is computed. In an example, computing the intersection includes comparing each member of the first metadata set and the second metadata set within a tolerance. Here, the tolerance is specific to a type of member in the two sets. The intersection will include members that are within the tolerance when it is not empty. In an example, an aspect of the tolerance is time.

At operation 420, an edge in a file graph is created based on the intersection from operation 415. In an example, a node in the file graph identifies a file. In an example, the node includes at least one of a user identification, a device identification, or a storage location. In an example, the file is identified by at least one of a path, a size, a name, or a hash of the file contents.

In an example, an edge in the file graph is a file creation type. Here, the first metadata set is empty. In an example, the edge is a file rename type. Here, the intersection does not include a file name. In an example, the edge is a file revision type. Here, the intersection does not include a content hash. In an example, the edge is a file move. Here, the intersection does not include a path. In an example, the edge is a file share. Here, the intersection does not include an access control list.

At operation 425, a query about the first file is received.

At operation 430, the second file is provided, based on the edge created in operation 420, as a result to the query or operation 425.

Figure 5:
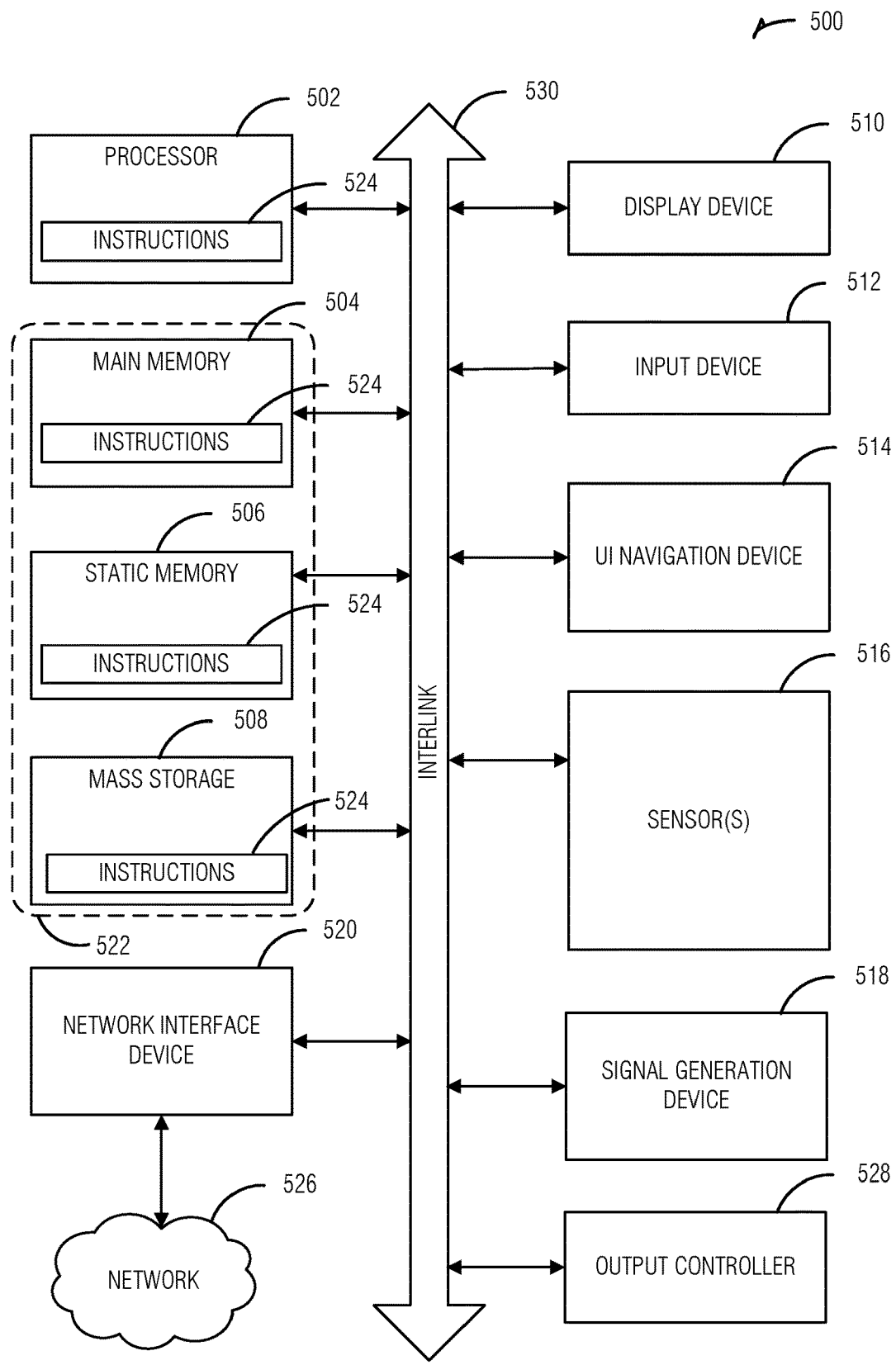
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drive, tape drive, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

Additional Notes & Examples

Example 1 is a device for dynamically building a file graph, the device comprising: a memory including instructions; and processing circuitry that, when in operation, is configured by the instructions to: receive a first metadata set for a first file; receive a second metadata set for a second file; compute an intersection of the first metadata set and the second metadata set; create an edge in a file graph based on the intersection; receive a query about the first file; and provide the second file, based on the edge, as a result to the query.

In Example 2, the subject matter of Example 1, wherein a node in the file graph identifies a file.

In Example 3, the subject matter of Example 2, wherein the node includes at least one of a user identification, a device identification, or a storage location.

In Example 4, the subject matter of any of Examples 2-3, wherein the file is identified by at least one of a path, a size, a name, or a hash of the file contents.

In Example 5, the subject matter of any of Examples 1-4, wherein the first metadata set is received in response to a first file synchronization operation, and wherein the second metadata set is received in response to a second file synchronization operation.

In Example 6, the subject matter of Example 5, wherein the first and the second file synchronization operations create a backup of a file system at a remote device.

In Example 7, the subject matter of any of Examples 1-6, wherein the edge is a file creation type, and wherein the first metadata set is empty.

In Example 8, the subject matter of any of Examples 1-7, wherein the edge is a file rename type, and wherein the intersection does not include a file name.

In Example 9, the subject matter of any of Examples 1-8, wherein the edge is a file revision type, and wherein the intersection does not include a content hash.

In Example 10, the subject matter of any of Examples 1-9, wherein the edge is a file move, and wherein the intersection does not include a path.

In Example 11, the subject matter of any of Examples 1-10, wherein the edge is a file share, and wherein the intersection does not include an access control list.

In Example 12, the subject matter of any of Examples 1-11, wherein, to compute the intersection, the processing circuitry compares each member of the first metadata set and the second metadata set within a tolerance, the tolerance specific to a type of member, the intersection including members that are within the tolerance.

In Example 13, the subject matter of Example 12, wherein an aspect of the tolerance is time.

Example 14 is a method for dynamically building a file graph, the method comprising: receiving a first metadata set for a first file; receiving a second metadata set for a second file; computing an intersection of the first metadata set and the second metadata set; creating an edge in a file graph based on the intersection; receiving a query about the first file; and providing the second file, based on the edge, as a result to the query.

In Example 15, the subject matter of Example 14, wherein a node in the file graph identifies a file.

In Example 16, the subject matter of Example 15, wherein the node includes at least one of a user identification, a device identification, or a storage location.

In Example 17, the subject matter of any of Examples 15-16, wherein the file is identified by at least one of a path, a size, a name, or a hash of the file contents.

In Example 18, the subject matter of any of Examples 14-17, wherein the first metadata set is received in response to a first file synchronization operation, and wherein the second metadata set is received in response to a second file synchronization operation.

In Example 19, the subject matter of Example 18, wherein the first and the second file synchronization operations create a backup of a file system at a remote device.

In Example 20, the subject matter of any of Examples 14-19, wherein the edge is a file creation type, and wherein the first metadata set is empty.

In Example 21, the subject matter of any of Examples 14-20, wherein the edge is a file rename type, and wherein the intersection does not include a file name.

In Example 22, the subject matter of any of Examples 14-21, wherein the edge is a file revision type, and wherein the intersection does not include a content hash.

In Example 23, the subject matter of any of Examples 14-22, wherein the edge is a file move, and wherein the intersection does not include a path.

In Example 24, the subject matter of any of Examples 14-23, wherein the edge is a file share, and wherein the intersection does not include an access control list.

In Example 25, the subject matter of any of Examples 14-24, wherein computing the intersection includes comparing each member of the first metadata set and the second metadata set within a tolerance, the tolerance specific to a type of member, the intersection including members that are within the tolerance.

In Example 26, the subject matter of Example 25, wherein an aspect of the tolerance is time.

Example 27 is a machine readable media including instructions to dynamically build a file graph, the instructions, when executed by processing circuitry, causing the processing circuitry to perform operations comprising: receiving a first metadata set for a first file; receiving a second metadata set for a second file; computing an intersection of the first metadata set and the second metadata set; creating an edge in a file graph based on the intersection; receiving a query about the first file; and providing the second file, based on the edge, as a result to the query.

In Example 28, the subject matter of Example 27, wherein a node in the file graph identifies a file.

In Example 29, the subject matter of Example 28, wherein the node includes at least one of a user identification, a device identification, or a storage location.

In Example 30, the subject matter of any of Examples 28-29, wherein the file is identified by at least one of a path, a size, a name, or a hash of the file contents.

In Example 31, the subject matter of any of Examples 27-30, wherein the first metadata set is received in response to a first file synchronization operation, and wherein the second metadata set is received in response to a second file synchronization operation.

In Example 32, the subject matter of Example 31, wherein the first and the second file synchronization operations create a backup of a file system at a remote device.

In Example 33, the subject matter of any of Examples 27-32, wherein the edge is a file creation type, and wherein the first metadata set is empty.

In Example 34, the subject matter of any of Examples 27-33, wherein the edge is a file rename type, and wherein the intersection does not include a file name.

In Example 35, the subject matter of any of Examples 27-34, wherein the edge is a file revision type, and wherein the intersection does not include a content hash.

In Example 36, the subject matter of any of Examples 27-35, wherein the edge is a file move, and wherein the intersection does not include a path.

In Example 37, the subject matter of any of Examples 27-36, wherein the edge is a file share, and wherein the intersection does not include an access control list.

In Example 38, the subject matter of any of Examples 27-37, wherein computing the intersection includes comparing each member of the first metadata set and the second metadata set within a tolerance, the tolerance specific to a type of member, the intersection including members that are within the tolerance.

In Example 39, the subject matter of Example 38, wherein an aspect of the tolerance is time.

Example 40 is a system for dynamically building a file graph, the system comprising: means for receiving a first metadata set for a first file; means for receiving a second metadata set for a second file; means for computing an intersection of the first metadata set and the second metadata set; means for creating an edge in a file graph based on the intersection; means for receiving a query about the first file; and means for providing the second file, based on the edge, as a result to the query.

In Example 41, the subject matter of Example 40, wherein a node in the file graph identifies a file.

In Example 42, the subject matter of Example 41, wherein the node includes at least one of a user identification, a device identification, or a storage location.

In Example 43, the subject matter of any of Examples 41-42, wherein the file is identified by at least one of a path, a size, a name, or a hash of the file contents.

In Example 44, the subject matter of any of Examples 40-43, wherein the first metadata set is received in response to a first file synchronization operation, and wherein the second metadata set is received in response to a second file synchronization operation.

In Example 45, the subject matter of Example 44, wherein the first and the second file synchronization operations create a backup of a file system at a remote device.

In Example 46, the subject matter of any of Examples 40-45, wherein the edge is a file creation type, and wherein the first metadata set is empty.

In Example 47, the subject matter of any of Examples 40-46, wherein the edge is a file rename type, and wherein the intersection does not include a file name.

In Example 48, the subject matter of any of Examples 40-47, wherein the edge is a file revision type, and wherein the intersection does not include a content hash.

In Example 49, the subject matter of any of Examples 40-48, wherein the edge is a file move, and wherein the intersection does not include a path.

In Example 50, the subject matter of any of Examples 40-49, wherein the edge is a file share, and wherein the intersection does not include an access control list.

In Example 51, the subject matter of any of Examples 40-50, wherein the means for computing the intersection include means for comparing each member of the first metadata set and the second metadata set within a tolerance, the tolerance specific to a type of member, the intersection including members that are within the tolerance.

In Example 52, the subject matter of Example 51, wherein an aspect of the tolerance is time.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for dynamically building a file lifecycle graph, the device comprising:
   a memory including instructions; and
   processing circuitry that, when in operation, is configured by the instructions to:
     receive a first metadata set for a first file;
     receive a second metadata set for a second file;
     compute an intersection of the first metadata set and the second metadata set;
     create an edge in a file lifecycle graph based on the intersection, wherein the edge is an event in a lifecycle of the first file;
     receive a query about the first file; and
     provide the second file, by traversing the edge in the file lifecycle graph from the first file, as a result to the query.

2. The device of claim 1, wherein a node in the file lifecycle graph identifies a file.

3. The device of claim 1, wherein the edge is a file creation type, and wherein the first metadata set is empty.

4. The device of claim 1, wherein the edge is a file rename type, and wherein the intersection does not include a file name.

5. The device of claim 1, wherein the edge is a file revision type, and wherein the intersection does not include a content hash.

6. The device of claim 1, wherein the edge is a file move, and wherein the intersection does not include a path.

7. The device of claim 1, wherein the edge is a file share, and wherein the intersection does not include an access control list.

8. The device of claim 1, wherein, to compute the intersection, the processing circuitry compares each member of the first metadata set and the second metadata set within a tolerance; the tolerance specific to a type of member, the intersection including members that are within the tolerance.

9. A method for dynamically building a file lifecycle graph, the method comprising:
   receiving a first metadata set for a first file;
   receiving a second metadata set for a second file;
   computing an intersection of the first metadata set and the second metadata set;
   creating an edge in a file lifecycle graph based on the intersection, wherein the edge is an event in a lifecycle of the first file;
   receiving a query about the first file; and
   providing the second file, by traversing the edge in the file lifecycle graph from the first file, as a result to the query.

10. The method of claim 9, wherein a node in the file lifecycle graph identifies a file.

11. The method of claim 9, wherein the edge is a file creation type, and wherein the first metadata set is empty.

12. The method of claim 9, wherein the edge is a file rename type, and wherein the intersection does not include a file name.

13. The method of claim 9, wherein the edge is a file revision type, and wherein the intersection does not include a content hash.

14. The method of claim 9, wherein the edge is a file move, and wherein the intersection does not include a path.

15. The method of claim 9, wherein the edge is a file share, and wherein the intersection does not include an access control list.

16. The method of claim 9, wherein computing the intersection includes comparing each member of the first metadata set and the second metadata set within a tolerance, the tolerance specific to a type of member, the intersection including members that are within the tolerance.

17. A non-transitory machine readable media including instructions to dynamically build a file graph, the instructions, when executed by processing circuitry, causing the processing circuitry to perform operations comprising:
receiving a first metadata set for a first file;
receiving a second metadata set for a second file;
computing an intersection of the first metadata set and the second metadata set;
creating an edge in a file lifecycle graph based on the intersection, wherein the edge is an event in a lifecycle of the first file;
receiving a query about the first file; and
providing the second file, by traversing the edge in the file lifecycle graph from the first file, as a result to the query.

18. The machine readable media of claim 17, wherein a node in the file lifecycle graph identifies a file.

19. The non-transitory machine readable media of claim 17, wherein the edge is a file creation type, and wherein the first metadata set is empty.

20. The non-transitory machine readable media of claim 17, wherein the edge is a file rename type, and wherein the intersection does not include a file name.

21. The non-transitory machine readable media of claim 17, wherein the edge is a file revision type, and wherein the intersection does not include a content hash.

22. The non-transitory machine readable media of claim 17, wherein the edge is a file move, and wherein the intersection does not include a path.

23. The non-transitory machine readable media of claim 17, wherein the edge is a file share, and wherein the intersection does not include an access control list.

24. The non-transitory machine readable media of claim 17, wherein computing the intersection includes comparing each member of the first metadata set and the second metadata set within a tolerance, the tolerance specific to a type of member, the intersection including members that are within the tolerance.

* * * * *

UNITED STATES PATENT AND TRADEMARK OFFICE
CERTIFICATE OF CORRECTION

| | | |
|---|---|---|
| PATENT NO. | : 11,436,279 B2 | |
| APPLICATION NO. | : 16/186376 | |
| DATED | : September 6, 2022 | |
| INVENTOR(S) | : Andrew Moravec | |

It is certified that error appears in the above-identified patent and that said Letters Patent is hereby corrected as shown below:

In the Claims

In Column 14, Line 43, in Claim 8, delete "tolerance;" and insert --tolerance,-- therefor In Column 16, Line 1, in Claim 18, before "machine", insert --non-transitory--

Signed and Sealed this
Twentieth Day of June, 2023

Katherine Kelly Vidal
*Director of the United States Patent and Trademark Office*